United States Patent
Cho et al.

(10) Patent No.: US 9,298,650 B2
(45) Date of Patent: Mar. 29, 2016

(54) MEMORY SYSTEM, SEMICONDUCTOR MEMORY DEVICE AND OPERATING METHOD THEREOF

(71) Applicant: SK HYNIX INC, Icheon-si, Gyeonggi-do (KR)

(72) Inventors: Wan Ik Cho, Anyang-si (KR); Sang Kyu Lee, Chungcheongbuk-do (KR); Myung Su Kim, Guri-si (KR); Seung Jae Chung, Suwon-si (KR)

(73) Assignee: SK HYNIX INC., Icheon-Si, Gyeonggi-Do (KR)

( * ) Notice: Subject to any disclaimer, the term of this patent is extended or adjusted under 35 U.S.C. 154(b) by 294 days.

(21) Appl. No.: 14/030,730

(22) Filed: Sep. 18, 2013

(65) Prior Publication Data
US 2014/0337574 A1    Nov. 13, 2014

(30) Foreign Application Priority Data
May 7, 2013    (KR) .................. 10-2013-0051174

(51) Int. Cl.
*G06F 12/02*    (2006.01)
*G06F 13/16*    (2006.01)

(52) U.S. Cl.
CPC ........ *G06F 13/1668* (2013.01); *G06F 12/0246* (2013.01); *G06F 13/1673* (2013.01); *G06F 2212/2022* (2013.01)

(58) Field of Classification Search
None
See application file for complete search history.

(56) References Cited

U.S. PATENT DOCUMENTS

2010/0085804 A1*  4/2010  Katagiri .................. G11C 7/08
                                                    365/163
2011/0069545 A1   3/2011  Futatsuyama et al.

* cited by examiner

*Primary Examiner* — Kevin Verbrugge
(74) *Attorney, Agent, or Firm* — Hauptman Ham, LLP

(57) ABSTRACT

Disclosed are a memory system, a semiconductor memory device and a method of operating the same. The memory system includes: a memory controller to output a command, address and data; and a semiconductor memory device to store at least one page data in each memory cell in response to the command, the address and the data, the memory controller to separately output first address used for determining the at least one page data from the data and second address used for determining a word line coupled to at least one memory cell.

20 Claims, 8 Drawing Sheets

< Address Part1 >

| Cycle | I07 | I06 | I05 | I04 | I03 | I02 | I01 | I00 |
|---|---|---|---|---|---|---|---|---|
| 1st | Column Address ||||||||
| 2nd | ||||||||
| 3rd | Page[LSB/CSB/MSB] Address ||||||||
| 4th | Block + LUN Address ||||||||
| 5th | ||||||||

< Address Part2 >

| Cycle | I07 | I06 | I05 | I04 | I03 | I02 | I01 | I00 |
|---|---|---|---|---|---|---|---|---|
| 1st | Column Address ||||||||
| 2nd | ||||||||
| 3rd | Word Line Address ||||||||
| 4th | Block + LUN Address ||||||||
| 5th | ||||||||

< Address Part1 >

| Cycle | IO7 | IO6 | IO5 | IO4 | IO3 | IO2 | IO1 | IO0 |
|---|---|---|---|---|---|---|---|---|
| 1st | Column Address ||||||||
| 2nd | ||||||||
| 3rd | Page LSB/CSB/MSB Address ||||||||
| 4th | Block + LUN Address ||||||||
| 5th | ||||||||

< Address Part2 >

| Cycle | IO7 | IO6 | IO5 | IO4 | IO3 | IO2 | IO1 | IO0 |
|---|---|---|---|---|---|---|---|---|
| 1st | Column Address ||||||||
| 2nd | ||||||||
| 3rd | Word Line Address ||||||||
| 4th | Block + LUN Address ||||||||
| 5th | ||||||||

MEMORY SYSTEM, SEMICONDUCTOR MEMORY DEVICE AND OPERATING METHOD THEREOF

CROSS-REFERENCE TO RELATED APPLICATION

The present application claims priority to Korean patent application number 10-2013-0051174 filed on May 7, 2013, in the Korean Intellectual Property Office. The disclosure of the above-listed application is hereby incorporated by reference herein in their entirety.

FIELD

The present disclosure relates to an electronic device and an operating method thereof and, more particularly, to a memory system, a semiconductor memory device, and an operating method thereof.

BACKGROUND

The statements in this section merely provide background information related to the present disclosure and do not constitute prior art. A semiconductor memory device is generally divided into a volatile memory device and a non-volatile memory device.

The volatile memory device offers fast read and write speeds but loses data stored in memory cells when power is removed. The non-volatile memory device has relatively slower read and write speeds but retains data even when a power supply is interrupted or blocked. Therefore, in order to store data that needs to be stored regardless of whether powered or not, the non-volatile memory device is employed. The non-volatile memory device includes a read only memory (ROM), a mask ROM (MROM), a programmable ROM (PROM), an erasable programmable ROM (EPROM), an electrically erasable programmable ROM (EEPROM), a flash memory, a phase change random access memory (PRAM), a magnetic RAM (MRAM), a resistive RAM (RRAM), a ferroelectric RAM (FRAM), etc. The flash memory is divided into a NOR flash memory and a NAND flash memory.

The flash memory has two advantages. First, it freely programs and erases data, an advantage of a random access memory (RAM). Second, it retains data even when not powered, an advantage of the ROM. The flash memory is widely used as a storage medium for mobile electronic devices such as a digital camera, a personal digital assistant (PDA), an MP3 player, etc.

Recently, as the number of memory cells included in a string and the number of bits in data stored in a memory cell increase in a semiconductor memory device, the inventor(s) has noted that it has become necessary to carry out a program operation of a semiconductor memory device in an effective manner.

SUMMARY

In accordance with some embodiments, a memory system comprises a memory controller and a semiconductor memory device. The memory controller is configured to output a command, address and data, and to separately output first address and second address. And the semiconductor memory device is configured to store at least one page data in each memory cell in response to the command, the address and the data. The first address is used for determining the at least one page data from the data and the second address is used for determining a word line coupled to at least one memory cell.

In accordance with some embodiments, a semiconductor memory device comprises a memory array and a peripheral circuit. The memory array is configured to include memory cells coupled to a word line and a bit line and to store at least one page data in each memory cell. And the peripheral circuit is configured to store the at least one page data in each memory cell in response to a command, address and data. The address is separated into first address for determining the at least one page data from the data and second address for determining the word line, and the peripheral circuit is configured to receive the first address and the second address input thereto.

In accordance with some embodiments, a memory system is configured to output a command, address and data to a semiconductor memory device from a memory controller, and to store at least one page data in the semiconductor memory device in response to the command, the address and the data.

In accordance with some embodiments, a semiconductor memory device is configured to input a command, address and data, to determine at least one page data from the data according to first address for determining the at least one page, and to store the determined at least one page data in a memory cell coupled to a word line determined according to second address for determining word lines.

DETAILED DESCRIPTION

Hereinafter, various embodiments will be described in detail with reference to the accompanying drawings. The figures are provided to allow those having ordinary skill in the art to understand the scope of the embodiments of the disclosure. The present disclosure is, however, embodied in different forms and should not be construed as limited to the embodiments set forth herein. Rather, these embodiments are provided so that this disclosure will be thorough and complete, and will fully convey the scope of the claimed invention to those skilled in the art.

Figure 1:
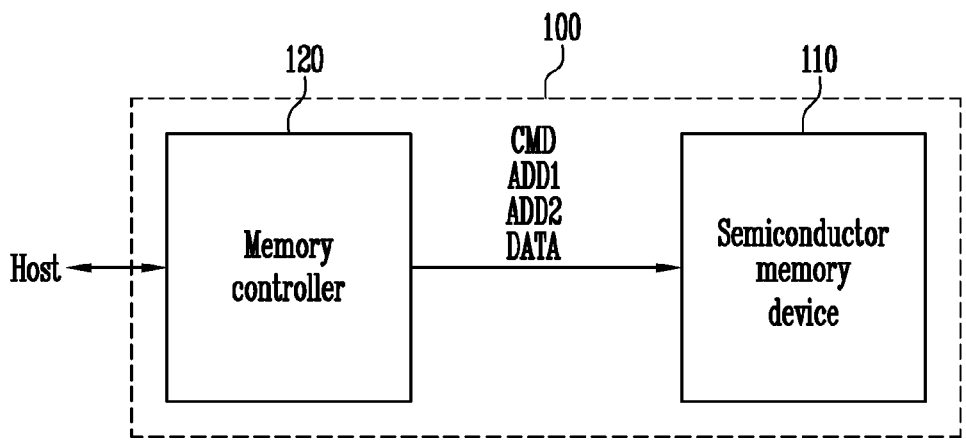
FIG. 1 is a block diagram of a memory system according to at least one embodiment.

FIG. 1 is a block diagram of a memory system according to at least one embodiment.

Referring to FIG. 1, the memory system 100 according to at least one embodiment includes a semiconductor memory device 110 and a memory controller 120.

The memory controller 120 outputs a command CMD, address ADD (e.g., ADD1 and ADD2) and data DATA to the semiconductor memory device 110 in response to a request by a host.

The semiconductor memory device 110 stores data corresponding to each of first page to nth page (hereinafter referred to as "first to nth page data") (where n is an integer that is 2 or greater) in each memory cell of the semiconductor memory device 110 in response to the command CMD, the address ADD and the data DATA. Here, 'page data' is data stored at the page address indicated by one of the first page (i.e, first page address) to nth page (i.e., nth page address).

The memory controller 120 separately outputs first address ADD1 and second address ADD2. The first address ADD1 is used for determining the first to nth page data. The second address ADD2 is used for determining a word line coupled to at least one memory cell of the semiconductor memory device 110. That is, the first address ADD1 and the second address ADD2 are discontinuously output to the semiconductor memory device 110. Here, "discontinuously output" means that the addresses (i.e., ADD1 and ADD2) are output from different address sets (or cycles), respectively.

The semiconductor memory device 110, according to a first command and the first address ADD1, determines the first to nth page data from the data DATA and, according to a second command and the second address ADD2, store the first to nth page data in at least one memory cell of the semiconductor memory device 110. The semiconductor memory device 110 simultaneously stores a plurality of page data corresponding to the first to nth page data into each of memory cells.

Figure 2:
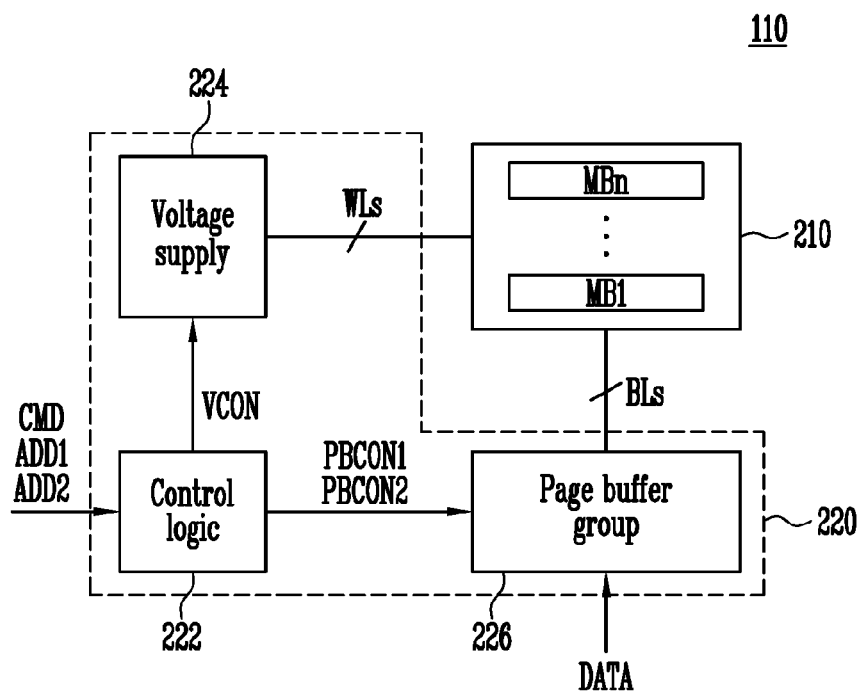
FIG. 2 is a block diagram of a semiconductor memory device shown in FIG. 1 according to at least one embodiment.
Figure 3:
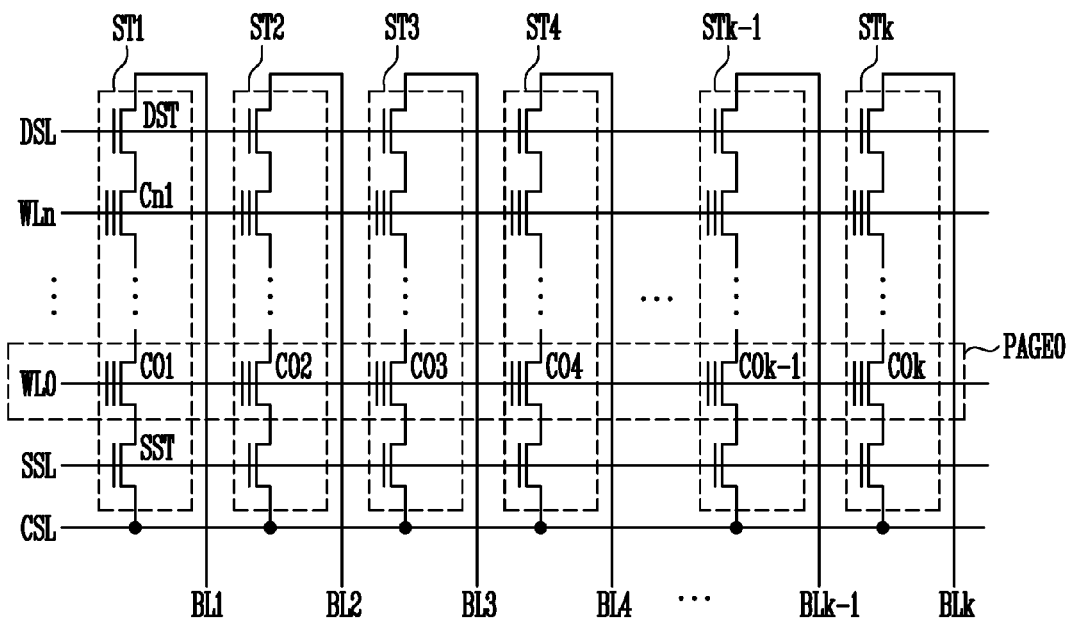
FIG. 3 is a circuit diagram of a memory block shown in FIG. 2 according to at least one embodiment.

FIG. 2 is a block diagram of a semiconductor memory device shown in FIG. 1. FIG. 3 is a circuit diagram of a memory block shown in FIG. 2.

The semiconductor memory device 110 according to at least one embodiment includes a memory array 210 having a plurality of memory blocks and a peripheral circuit 220 configured to perform a program operation of the memory cells included in a selected page of memory blocks MB1 to MBn according to the command CMD input from the memory controller 120, the first and second address ADD1 and ADD2 and the data DATA.

Each of the memory cells included in the memory array 210 stores the first to nth page data (where n is an integer that is 2 or greater).

The first address ADD1 for determining the first to nth page data and the second address ADD2 for determining the word line are separated from each other such that the peripheral circuit 220 receives the first address ADD1 and the second address ADD2 discontinuously input (or transmitted from) by the memory controller 120.

That is, the first address ADD1 and the second address ADD2 are input to the peripheral circuit 220 at different address sets (or cycles).

The peripheral circuit 220 determines the first to nth page data from the data DATA according to the first command and the first address ADD1 and thereafter stores the first to nth page data in the memory cell of the memory array 210 according to the second command and the second address ADD2. The peripheral circuit 220 simultaneously stores a plurality of page data corresponding to the first to nth page data in each of memory cells.

The memory array 210 includes a plurality of memory blocks MB1 to MBn.

Referring to FIG. 3, each of the memory blocks includes strings ST1 to STk between bit lines BL1 to BLk and a common source line CSL. The strings ST1 to STk are coupled to the bit lines BL1 to BLk respectively and coupled to the common source line CSL in common. Each of the strings ST1 to STk includes a source selection transistor SST where a source is coupled to the common source line CSL, memory cells C01 to Cn1, and a drain selection transistor DST where a drain is coupled to the bit line BL1. The memory cells C01 to Cn1 are coupled in series between the selection transistors SST and DST. A gate of the source selection transistor SST is coupled to a source selection line SSL, and gates of the memory cells C01 to Cn1 are coupled to the word lines WL0 to WLn, respectively, and a gate of the drain selection transistor DST is coupled to the drain selection line DSL.

Memory cells included in a memory block in a NAND flash memory device are categorized by a physical page unit or a logical page unit. For example, the memory cells C01 to C0k coupled to a word line (for example, WL0) make up a physical page PAGE0. In addition, even-numbered memory cells C0e1 to C0ek coupled to a word line (for example, WL0) make up an even physical page, and odd-numbered memory cells C0o1 to C0ok make up an odd physical page. Such page (or, an even page and an odd page) becomes a basic unit in the program operation or a read operation. The data stored in the memory cells coupled to the word line make up a logical page. That is, when n-bit data is stored in each of the memory cells, n logical pages are made. In this embodiment, a case where the memory cells coupled to one word line make up one physical page and n logical pages will be described as an example. However, the present disclosure is not limited thereto.

Referring to FIGS. 2 and 3, the peripheral circuit 220 includes a control logic 222, a voltage supply 224 and a page buffer group 226.

The control logic 222 outputs a voltage control signal VCON to generate a voltage needed to perform the program operation, a verification operation or the read operation in response to the command CMD and the first and second address ADD1 and ADD2 input from an outside. Depending on a type of an operation, the control logic 222 outputs PB control signals PBCON1 and PBCON2 to control page buffers PB1 to PBk included in the page buffer group 226. An operation in which the control logic 222 controls the page buffer group 226 will be described below.

The voltage supply 224 supplies operation voltages needed for the program operation and the read operation for the memory cells in response to the voltage control signal VCON of the control logic 222 to local lines including the drain selection line DSL, the word lines WL0 to WLn and the source selection line SSL of a selected memory block. The voltage supply 224 includes a voltage generating circuit (not shown) and a row decoder (not shown).

The voltage generating circuit outputs operation voltages needed for the program operation or the read operation of the memory cells in response to the voltage control signal VCON to global lines (not shown). For example, the voltage generating circuit outputs a program voltage to be applied to the memory cells of a selected page and a pass voltage to be applied to unselected memory cells to the global lines. The voltage generating circuit for the read operation outputs a read voltage to be applied to the memory cells of the selected page and the pass voltage to be applied to the unselected memory cells to the global lines.

The row decoder couples the global lines to local lines DSL, WL0 to WLn and SSL such that the operation voltages, output from the voltage generating circuit to the global lines, are transmitted from the memory array 210 to the local lines DSL, WL0 to WLn and SSL of the selected memory block MB in response to the second address signals ADD2 of the control logic 222. The program voltage or the read voltage is applied, through the global word line (not shown) from the voltage generating circuit, to a local word line (for example, WL0) to which a selected cell (for example, C01) is coupled. The pass voltage is applied, through the global word lines from the voltage generating circuit, to local word lines (for example, WL1 to WLn) to which unselected cells C11 to Cn1 are coupled. Accordingly, data are stored in the selected cell C01 by the program voltage or data stored in the selected cell C01 are read by the read voltage.

The page buffer group 226 includes page buffers PB1 to PBk coupled to the memory array 210 through the bit lines BL1 to BLk, respectively. The page buffers PB1 to PBk of the page buffer group 226 determines the first to nth page data from the data input to store data in the memory cells C01 to C0k in response to a first PB control signal PBCON1 of the control logic 222 and stores the first to nth page data in the memory cell in response to a second PB control signal PBCON2.

The detailed structure of the page buffer will be described below.

An input/output circuit (not shown) transmits the data DATA input from the outside to store the data DATA in the memory cells during the program operation to the page buffer group 226. The page buffers PB1 to PBk store the input data in a latch inside. Also, the input/output circuit outputs the data from the page buffers PB1 to PBk of the page buffer group 226 to the outside during the read operation.

Figure 4:
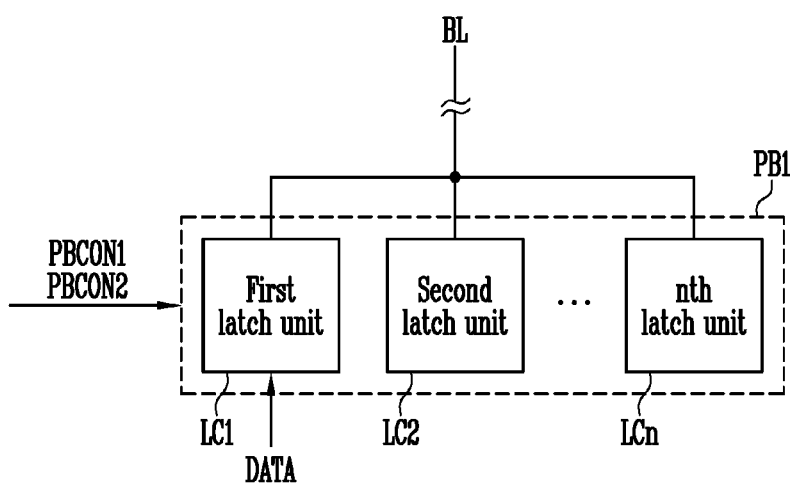
FIG. 4 is an exemplary block diagram of a page buffer shown in FIG. 2 according to at least one embodiment.

FIG. 4 is a block diagram of a page buffer shown in FIG. 2.

Referring to FIG. 4, the page buffer PB1 operates in response to the first and second PB control signals PBCON1 and PBCON2 output from the control logic (reference numeral 222 in FIG. 2).

The page buffer PB1 includes a bit line coupling circuit, a precharge circuit and latch units LC1 to LCn. Only the latch units LC1 to LCn will be described below.

The latch units LC1 to LCn are coupled in parallel. The number of the latch units LC1 to LCn varies depending on the design. A first latch unit LC1 temporarily store the data DATA input from the outside and transmit the data DATA to one of the latch units among the second to nth latch units LC2 to LCn, or temporarily store the data read from the memory cell by the read operation to output to the outside. The input data DATA is temporarily stored in the first latch unit LC1 in response to the first PB control signal PBCON1 and transmitted to the second to nth latch units LC2 to LCn. The first PB control signal PBCON1 changes according to the page address (the first address) input from the memory controller. Accordingly, the input data DATA is determined as the first to nth page data and stored in the first to nth latch units LC1 to LCn according to the first PB control signal PBCON1. In order to perform such operation, the latch units LC1 to LCn include a plurality of switching devices and latches.

Figures 5, 6:
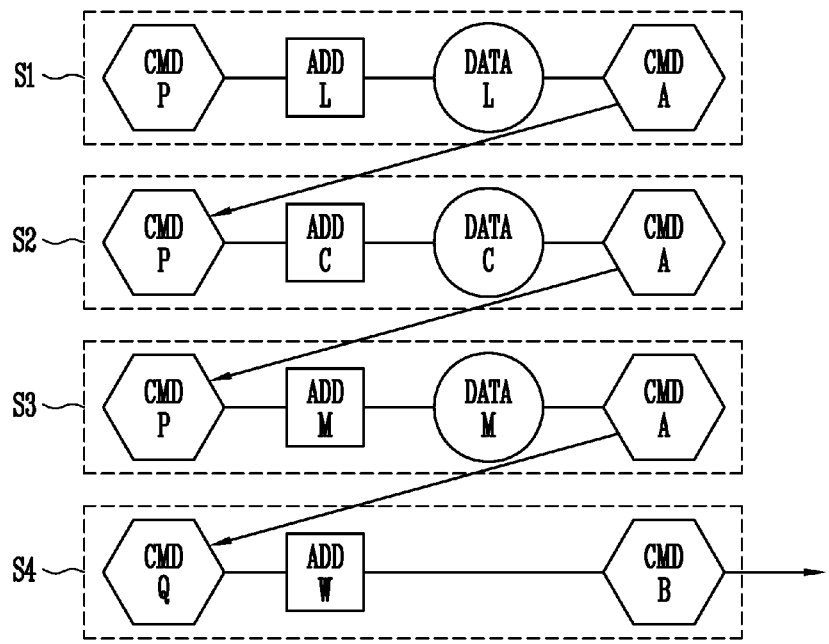
FIG. 5 is a drawing of the structure of an address input to the semiconductor memory device shown in FIG. 1 according to at least one embodiment.
FIG. 6 is a block diagram of a command, address and data input to the semiconductor memory device shown in FIG. 1 according to at least one embodiment.

FIG. 5 is a drawing of the structure of an address input to the semiconductor memory device shown in FIG. 1.

Referring to FIG. 5, the address is input from the memory controller 120 as a unit of 8 bits in 5 cycles through input/output terminals IOU to 107. The five cycle address constitutes one address set. A column address is input in the first and second cycles of the address set, a page address or a word line address is input in the third cycle, and a block address and a device address LUN Address is input in the fourth and fifth cycles.

In at least one embodiment, the address input from the memory controller is divided into two parts. In other words, two address sets are input from the memory controller. A page address is input in the third cycle for a first address set, and a word line address is input in the third cycle for a second address set. Accordingly, a problem is solved where the word line and page addresses could not all be displayed in one cycle due to increase in the number of word lines and the number of bits of the data stored in the memory cell.

Figure 7:
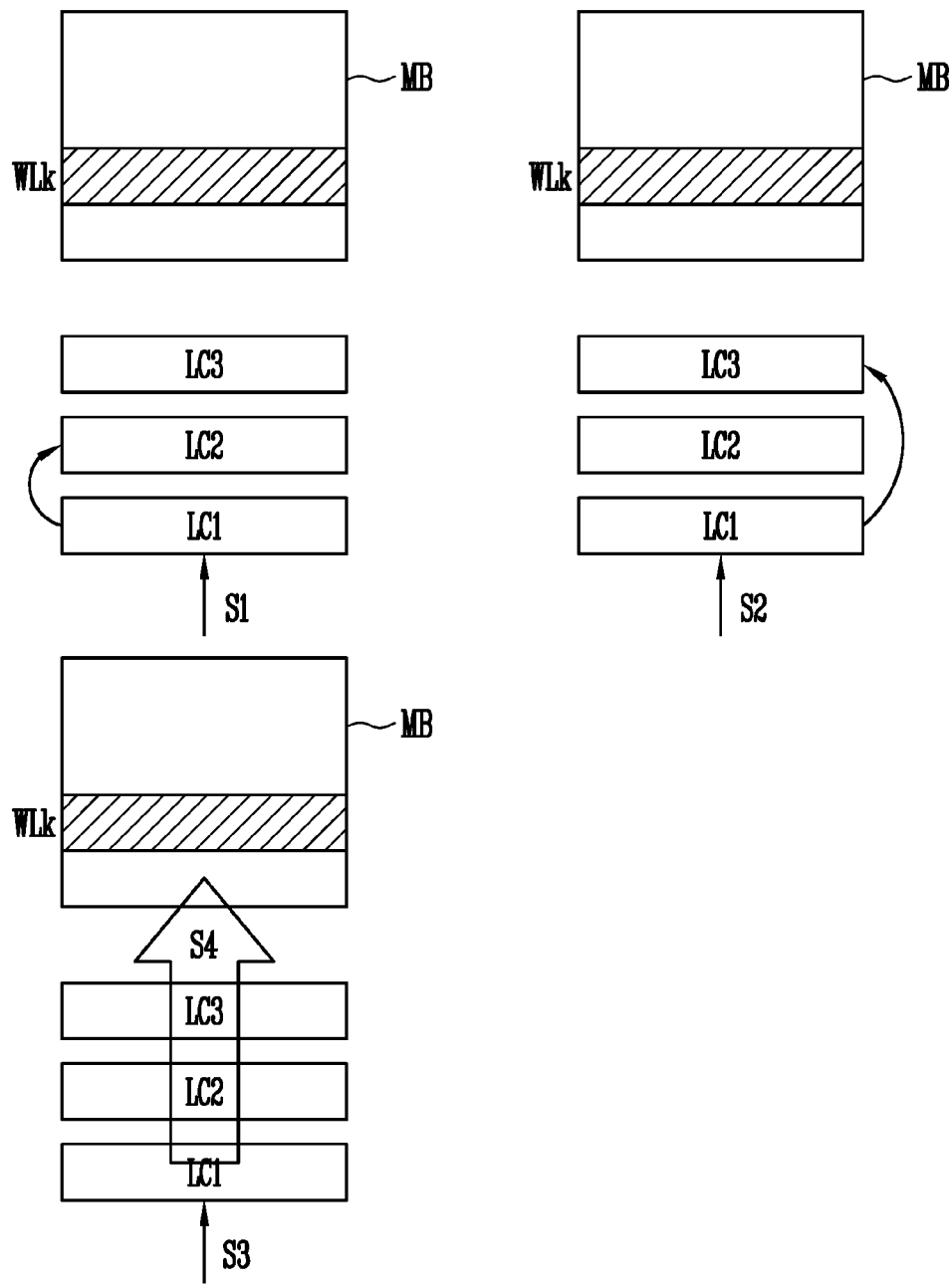
FIG. 7 is a block diagram of data transmission between a memory block and a page buffer shown in FIG. 2 according to the command, the address and the data shown in FIG. 6 according to at least one embodiment.

Referring to FIGS. 6 and 7, a semiconductor memory device and a method of operating the semiconductor memory device according to at least one embodiment will be described below. For convenience, a case where 3-bit data is stored in a memory cell will be described as an example.

FIG. 6 is a block diagram of a command, address and data input to the semiconductor memory device shown in FIG. 1. FIG. 7 is a block diagram of data transmission between a memory block and a page buffer (i.e., page buffer group of FIG. 2, hereinafter referred to as "page buffer") shown in FIG. 2 according to the command, the address and the data shown in FIG. 6.

Referring to FIGS. 6 and 7, when a first program command CMD P, a lower page address ADD L, data DATA_L and a page buffer send command CMD A are input from the memory controller 120, the input data is temporarily stored in the first latch unit LC1 of the page buffer, determined as lower-bit data and transmitted to the second latch unit LC2 (S1).

When the first program command CMD P, a middle page address ADD C, data DATA_C and the page buffer send command CMD A are input, the input data are temporarily stored in the first latch unit LC1 of the page buffer, determined as middle-bit data and transmitted to the third latch unit LC3 (S2).

When the first program command CMD P, an upper page address ADD M, data DATA_M and the page buffer send command CMD A are input, the input data is determined as upper-bit data and stored in the first latch unit LC1 of the page buffer (S3).

When a second program command CMD Q, a word line address ADD W and a program confirm command CMD B are input, the lower-bit data, the middle-bit data and the upper-bit data are programmed into the memory cell of the word line determined by the word line address (S4). The lower-bit data, the middle-bit data and the upper-bit data are programmed simultaneously.

In a method of operating a semiconductor memory device according to at least one embodiment, a page address and a word line address are separated (or "discontinued", which here means that the addresses are input from different address sets (or cycles), respectively) from each other and the separated addresses are input. By determining the input data as data on each page and programming the data on each page into the memory cell of the determined word line, data are efficiently programmed into the memory cell even though the number of the word lines and data bits stored into the memory cells is increase.

As described above, after the lower-bit data, the middle-bit data and the upper-bit data are programmed after they are input from the memory controller, programming the lower-bit data, the middle-bit data and the upper-bit data into the memory cells are possible after reading, from the memory cell storing the lower-bit data, the memory cell storing the middle-bit data and the memory cell storing the upper-bit data, and storing the lower-bit data, the middle-bit data and the upper-bit data in the respective latch unit of the page buffer. In addition, after storing the read data in each latch unit, performing an error correction operation ECC by outputting the data to the memory controller, storing the corrected data in each latch unit and programming into the memory cell is possible.

In at least one embodiment, it is possible to achieve the same purpose as a command is input for transmitting data to a predetermined latch unit of a page buffer instead of inputting a page address from a memory controller.

When the first program command CMD P, the word line address ADD W, data DATA_L and the first page buffer send command are input, the input data is temporarily stored in the first latch unit LC1 of the page buffer, determined as the lower-bit data and transmitted to the second latch unit LC2 (S1).

When the first program command CMD P, the word line address ADSD W, the data DATA_C and the second page buffer send command are input, the input data are temporarily stored in the first latch unit LC1 of the page buffer, determined as the mid-bit data and transmitted to a third latch unit LC3 (S2).

When the first program command CMD P, the word line address ADD W, the data DATA_M and the program confirm command are input, the input data are stored in the first latch unit LC1 of the page buffer (S3), and the lower-bit data, the middle-bit data and the upper-bit data are programmed into the memory cell of the word line determined by the word line address (S4). The lower-bit data, the middle-bit data and the upper-bit data are simultaneously programmed.

In at least one embodiment, program order information is input together with the word line address when the word line address is input. The program order information refers to a sequence in which the lower-bit data, the middle-bit data and the upper bit data between the word lines are programmed in order to reduce interference phenomena when storing n-bit data into the memory cell. For example, in FIG. 3, programming is performed in the following order: the lower-bit data is programmed into the memory cell C01 coupled to the first word line WL0; the lower-bit data is programmed into the memory cell C11 coupled to the second word line WL1; the middle-bit data is programmed into the memory cell C01 coupled to the first word line WL0; the lower-bit data is programmed into the memory cell C21 coupled to the third word line WL2; the middle-bit data is programmed into the memory cell C11 coupled to the second word line WL1; and the upper-bit data is programmed into the memory cell C01 coupled to the first word line WL0.

In at least one embodiment, using a predetermined command is possible which determines a program sequence if it is the purpose to achieve the same purpose as the previously described embodiments without separating the word line address from the page address.

Although a case where 3-bit data is stored into a memory cell is described as an example, the present disclosure is not limited thereto, and cases where 2-bit or 4-bit data is stored are also possible.

Figure 8:
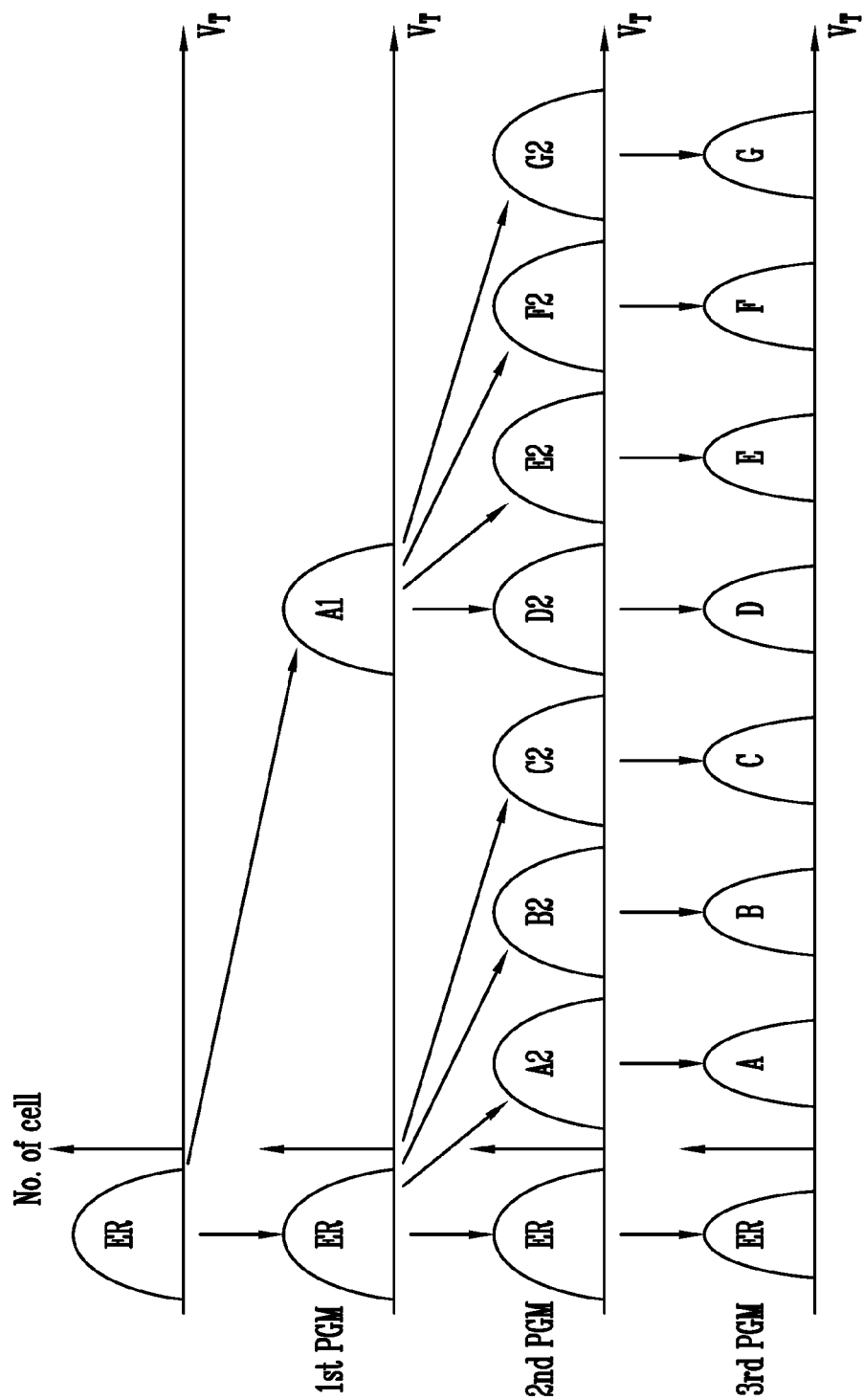
FIG. 8 is a drawing of a program sequence used in the semiconductor memory device shown in FIG. 1 according to at least one embodiment.
Figure 9:
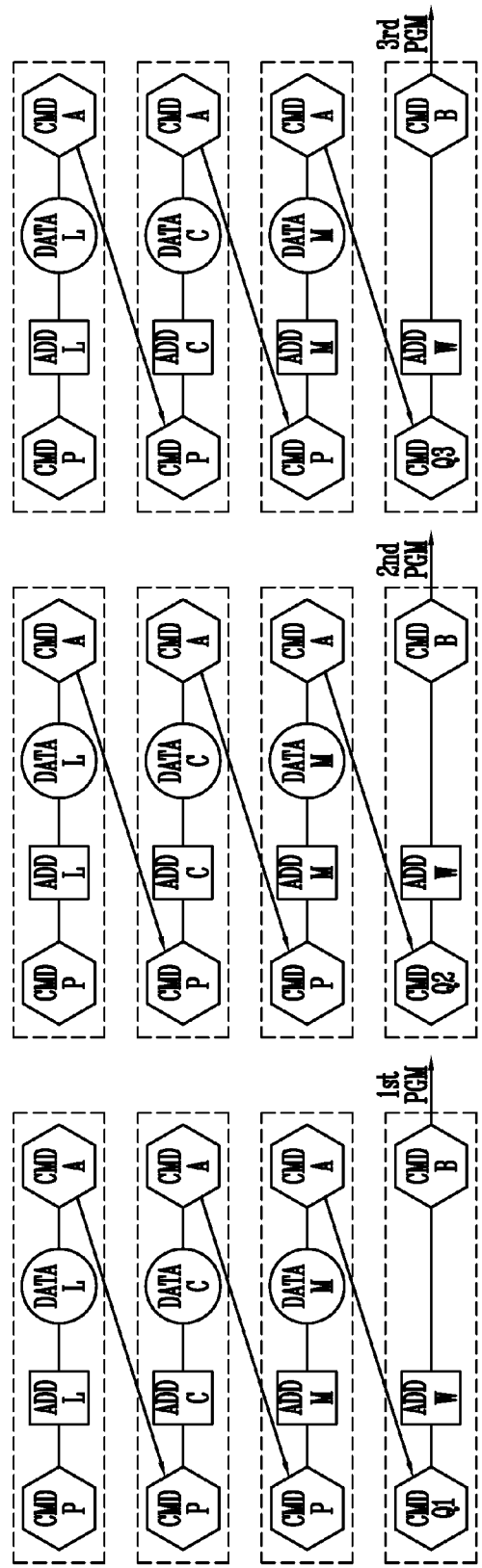
FIG. 9 is a block diagram of the command, the address and the data input to the semiconductor memory device when a program method shown in FIG. 8 is used according to at least one embodiment.

FIG. 8 is a drawing of a program sequence used in the semiconductor memory device shown in FIG. 1. FIG. 9 is a block diagram of the command, the address and the data input to the semiconductor memory device when a program method shown in FIG. 8 is used.

Referring to FIG. 8, threshold voltage distributions ER and A1 is formed in a first program stage based on the lower-page data corresponding to a least significant bit among 3-bit data.

Threshold voltage distributions ER, A2 to G2 are formed in a second program stage based on the middle-page data corresponding to a middle bit among the 3-bit data and the upper-page data corresponding to a most significant bit.

The threshold voltage distributions ER, A2 to G2 are formed in a third program stage in detail based on the middle-page data corresponding to the middle data among the 3-bit data and the upper-page data corresponding to the most significant bit among the 3-bit data. Due to the third program, width of each threshold voltage distribution is narrowed and margins between the threshold voltage distributions become greater.

Referring to FIG. 9, when the first program command CMD_P, the lower page address ADD L, the data DATA_L and the page buffer send command CMD A are input from the memory controller, the input data are temporarily stored in the first latch unit LC1 of the page buffer, determined as the lower-bit data and sent to the second latch unit LC2.

When the first program command CMD P, the middle page address ADD C, the data DATA_C and the page buffer send command CMD A are input, the input data are temporarily stored in the first latch unit LC1 of the page buffer, determined as the middle-bit data and sent to the third latch unit LC3.

When the first program command CMD P, the upper-page address ADD M, the data DATA_M and the page buffer send command CMD A are input, the input data are determined as the upper-bit data and stored in the first latch unit LC1 of the page buffer.

When the second program command CMD Q1, the word line address ADD W and the program confirm command CMD B are input, a first program operation is performed to the memory cell of the word line determined by the word line address.

When the second program command CMD Q2, the word line address ADD W and the program confirm command CMD B are input, a second program operation is performed to the memory cell of the word line determined by the word line address.

When the second program command CMD Q3, the word line address ADD W, the program confirm command CMD B are input, a third program operation is performed to the memory cell of the word line determined by the word line address.

In at least one embodiment, the program order information is input together with the word line address when the word line address is input. The program order information refers to a sequence in which first to third program operations are performed. For example, in FIG. 3, programming is performed in the following order: the first program operation is performed to the memory cell C01 coupled to the first word line WL0; the first program operation is performed to the memory cell C11 coupled to the second word line WL1; the second program operation is performed to the memory cell C01 coupled to the first word line WL0; the first program operation is performed to the memory cell C21 coupled to the third word line WL2; the second program operation is performed to the memory cell C11 coupled to the second word line WL1; and the third program operation is performed to the memory cell C01 coupled to the first word line WL0.

Figure 10:
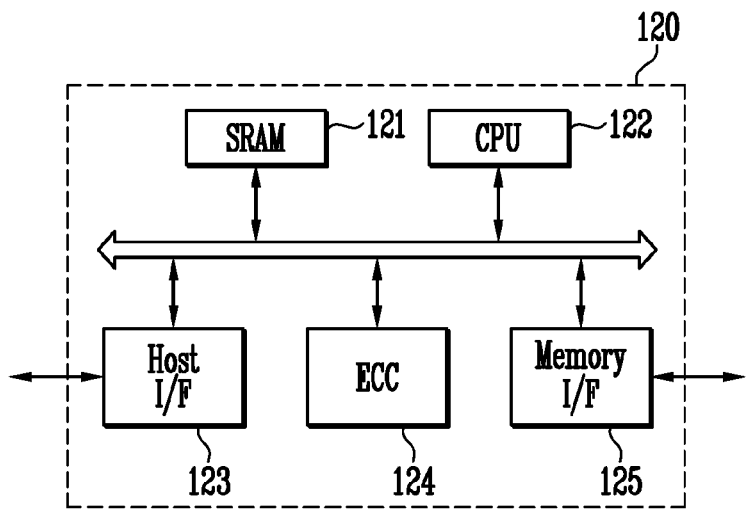
FIG. 10 is a block diagram of the detailed configuration of a memory controller shown in FIG. 1 according to at least one embodiment.

FIG. 10 is a block diagram of the detailed configuration of a memory controller shown in FIG. 1.

The memory system 100 shown in FIG. 1 is provided as a memory card or a solid state disk SSD based on a combination of the semiconductor memory device 110 and the memory controller 120.

Referring to FIG. 10, the memory controller 120 includes a SRAM 121, a processing unit 122, a host interface (or Host I/F) 123, an error correction block (ECC) 124 and a memory interface (or Memory I/F) 125. The SRAM 121 is used as an operating memory of the processing unit (CPU) 122. The host interface (Host I/F) 123 includes a data exchange protocol of a host coupled to the memory system 100. The error correction block (ECC) 124 detects and corrects an error included in the data read from the semiconductor memory device 110. The memory interface (Memory I/F) 125 interfaces with the semiconductor memory device 110. The processing unit (CPU) 122 performs all types of control operations for exchanging data of the memory controller 120.

Although not shown in the drawings, it is obvious to a person of ordinary skill in the art that a ROM (not shown) for storing code data for interfacing with a host is further included in the memory system 100 according to at least one embodiment. The semiconductor memory device 110 is provided as a multi-chip package consisting of a plurality of flash memory chips. The memory system 100 in at least one embodiment is provided as a highly reliable storage medium with a low possibility of error. In particular, the flash memory device in at least one embodiment is included in a memory system such as a semiconductor disk device (solid state disk, hereinafter SSD) which is recently actively researched. In this case, the memory controller 120 is configured to communicate with the outside (e.g., a host) through one of the various interface protocols such as USB, MMC, PCI-E, SATA, PATA, SCSI, ESDI, IDE, etc.

Figure 11:
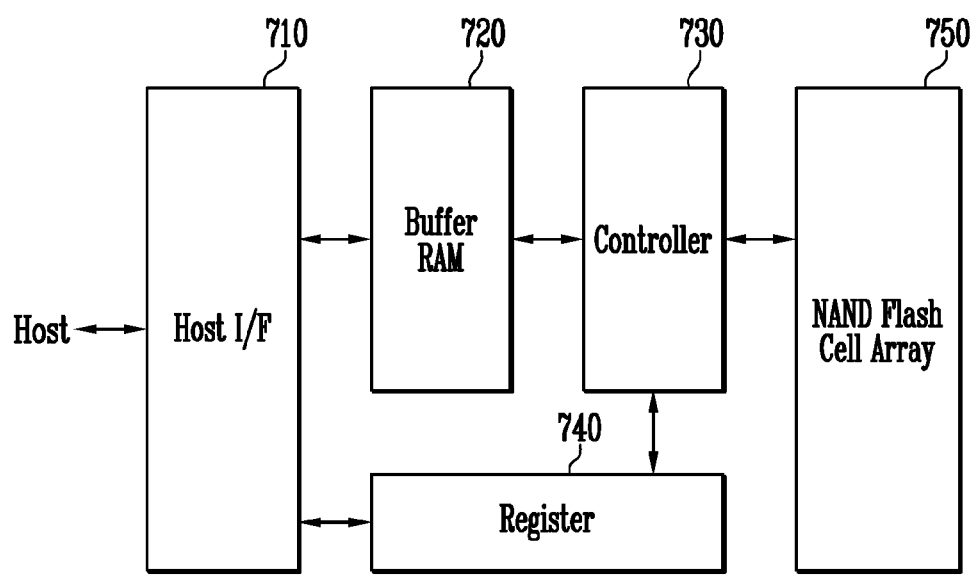
FIG. 11 is a block diagram of a fusion memory device or a fusion memory system performing a program operation according to various embodiments previously described.

FIG. 11 is a block diagram of a fusion memory device or a fusion memory system performing a program operation according to various embodiments previously described. For example, technical features of the present disclosure are applied to an OneNAND flash memory device 700 as a fusion memory device.

The OneNAND flash memory device 700 includes a host interface (Host I/F) 710 configured to exchange various information with an device using different protocols, a buffer RAM 720 with built-in codes for operating a memory device or temporarily storing data, a controller 730 configured to control reading, programming and all states in response to a control signal and a command provided from the outside, a register 740 configured to store data such as the configuration, etc. defining a command, an address, a system operating environment in the memory device and a NAND flash cell array 750 configured as an operating circuit including a non-volatile memory cell and a page buffer. The OneNAND flash memory device 700 programs data according to the method described earlier in response to a write request from the host.

Figure 12:
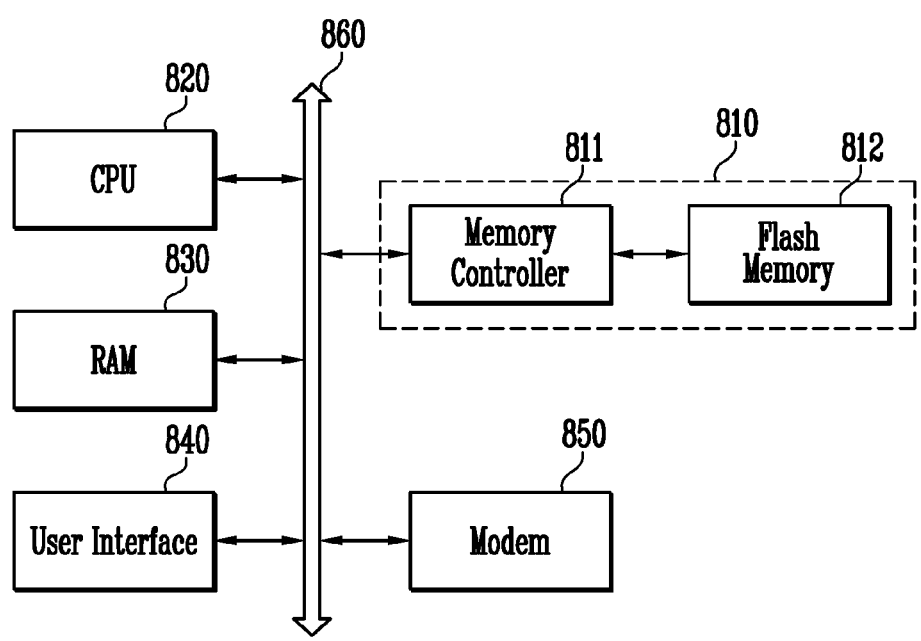
FIG. 12 is a block diagram of a computing system including a flash memory device according to at least one embodiment.

FIG. 12 is a block diagram of a computing system including a flash memory device according to at least one embodiment.

A computing system 800 according to at least one embodiment includes a microprocessor (CPU) 820, a RAM 830, a user interface 840, a modem 850 such as a baseband chipset, and a memory system 810, electrically connected to a microprocessor 820. If the computing system 800 according to at least one embodiment is a mobile device, a battery (not shown) for supplying an operation voltage of the computing system 800 will be additionally provided. Although not shown in the drawings, it is obvious to a person of ordinary skill in the art that the computing system 800 according to at least one embodiment further includes an application chipset, a camera image processor CIS, a mobile DRAM, etc. The memory system 810, for example, is a solid state drive or disk SSD that uses a non-volatile memory for storing data. Also, the memory system 810 is provided as a fusion flash memory (e.g., the OneNAND flash memory).

By way of summation and review, a memory system, a semiconductor memory device and a method of operating the same according to at least one embodiment separately input (in a discontinuous manner) a page address and a word line address, respectively determine as 'page data' data input by using each page address and respectively program the determined 'page data' in a memory cell corresponding to the word line indicated (or determined) by each word line address. As a result, even though the number of word lines and memory cells increases, programming of data into a memory cell is done efficiently.

Various embodiments described above are not limited to a device and a method but is implemented through a program implementing functions corresponding to the features of embodiments or a non-transitory, computer-readable recording medium where the program is recorded. Such implementation is easily done by a person of ordinary skill in the art based on the description of the embodiments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment are used singly or in combination with features, characteristics, and/or elements described in connection with other embodiments unless otherwise specifically indicated. Accordingly, it will be understood by those of skill in the art that various changes in form and details are made without departing from the spirit and scope of the claimed invention as set forth in the following claims.

What is claimed is:

1. A memory system, comprising:
   a memory controller configured to output a command, address and data; and
   a semiconductor memory device configured to store at least one page data in each memory cell in response to the command, the address and the data,
   wherein the memory controller is configured to output first address corresponding to a first command and to output second address corresponding to a second command, and
   wherein
   the first address includes column address, page address and block address,
   the second address includes the column address, word line address and the block address,
   the page address is used for determining the at least one page data from the data, and
   the word line address is used for determining a word line coupled to at least one memory cell.

2. The memory system of claim 1, wherein the memory controller is configured to output the first address and the second address at different address sets.

3. The memory system of claim 1, wherein the semiconductor memory device is configured to
   determine the at least one page data from the data according to the first command and the first address, and
   store the determined at least one page data in the at least one memory cell according to the second command and the second address.

4. The memory system of claim 3, wherein the semiconductor memory device is configured to store the at least one page data in the at least one memory cell simultaneously.

5. The memory system of claim 1, wherein the semiconductor memory device further comprises:
- a memory array configured to include the at least one memory cell;
- a control logic configured to generate first and second control signals in response to the first and second address; and
- a page buffer configured to, in response to the first control signal, determine the at least one page data from the data and, in response to the second control signal, store the at least one page data in the at least one memory cell.

6. A semiconductor memory device, comprising:
- a memory array configured to include memory cells coupled to a word line and a bit line and to store at least one page data in each memory cell; and
- a peripheral circuit configured to store the at least one page data in each memory cell in response to a command, address and data,
- wherein the address is separated into first address corresponding to a first command second address corresponding to a second command, and
- wherein
  - the peripheral circuit is configured to receive the first address and the second address separately,
  - the first address includes column address, page address and block address,
  - the second address includes the column address, word line address and the block address,
  - the page address is used for determining the at least one page data from the data, and
  - the word line address is used for determining the word line.

7. The semiconductor memory device of claim 6, wherein the peripheral circuit is configured to
- determine the at least one page data from the data according to the first command and the first address and
- store the determined at least one page data in each memory cell according to the second command and the second address.

8. The semiconductor memory device of claim 7, wherein the peripheral circuit is configured to store the at least one page data in each memory cell simultaneously.

9. The semiconductor memory device of claim 6, wherein the first address and the second address are input to the peripheral circuit at different address sets.

10. The semiconductor memory device of claim 6, wherein the peripheral circuit comprises:
- a control logic configured to generate first to third control signals in response to the command and the first and second address;
- a page buffer configured to, in response to the first control signal, determine the at least one page data from the data and store the at least one page data and, in response to the second control signal, load the at least one page data to the bit line; and
- a voltage supply configured to supply an operation voltage to a predetermined word line in response to the third control signal.

11. The semiconductor memory device of claim 10, wherein the page buffer is configured to include at least one latch unit and store the at least one data in the at least one latch unit in response to the first control signal.

12. The semiconductor memory device of claim 11, wherein one latch unit of the at least one latch unit is configured to transmit the data to other latch units in response to the first control signal.

13. A method operated by a memory system, the method comprising:
- outputting a command, address and data to a semiconductor memory device from a memory controller; and
- storing at least one page data in the semiconductor memory device in response to the command, the address and the data,
- wherein the address is separated into first address corresponding to a first command and second address corresponding to a second command, and
- wherein
  - the first address includes column address, page address and block address,
  - the second address includes the column address, word line address and the block address,
  - the page address is used for determining the at least one page data from the data,
  - the word line address is used for determining word lines of the semiconductor memory device, and
  - the first address and the second address are output by the memory controller.

14. The method of claim 13, wherein the first address and the second address are output at different address sets.

15. The method of claim 13, wherein the step of storing at least one page data comprises:
- determining the at least one page data according to the first command and the first address; and
- storing the determined at least one page data in each memory cell according to the second command and the second address.

16. The method of claim 15, wherein the at least one page data is simultaneously stored in each memory cell.

17. A method operated by a semiconductor memory device, the method comprising:
- receiving a first command, first address and data, the first address comprises column address, page address and block address;
- determining at least one page data from the data according to the page address for determining the at least one page; and
- receiving a second command, second address and data, the second address comprises the column address, word line address and the block address; and
- storing the determined at least one page data in a memory cell coupled to a word line determined according to the word line address.

18. The method of claim 17, wherein the first address and the second address are input at different address sets.

19. The method of claim 17, wherein the step of determining the at least one page data comprises:
- inputting the data into one latch unit of a page buffer;
- transmitting the data input into the one latch unit to one of other latch units according to the first address; and
- repeating the inputting and the transmitting until data is stored in all of the latch units of the page buffer.

20. The method of claim 17, further comprising:
- simultaneously storing the determined at least one page data in the memory cell.

* * * * *